(12) United States Patent
Rooney et al.

(10) Patent No.: US 7,048,022 B2
(45) Date of Patent: May 23, 2006

(54) TIRE TREAD WITH ANTI-PUNCTURE PADS

(75) Inventors: Timothy Michael Rooney, Munroe Falls, OH (US); James Joseph Nespo, Mogadore, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 151 days.

(21) Appl. No.: 10/714,245

(22) Filed: Nov. 14, 2003

(65) Prior Publication Data
US 2005/0103416 A1 May 19, 2005

(51) Int. Cl.
*B60C 11/01* (2006.01)
*B60C 11/11* (2006.01)
*B60C 11/13* (2006.01)

(52) U.S. Cl. .................. 152/209.16; 152/209.19; 152/523; 152/902; 152/DIG. 1

(58) Field of Classification Search ........... 152/209.12, 152/209.13, 209.15, 209.16, 209.19, 209.28, 152/DIG. 1, 902, 523; D12/605
See application file for complete search history.

(56) References Cited

U.S. PATENT DOCUMENTS

| | | | |
|---|---|---|---|
| D168,494 S | 12/1952 | Beckman | D90/20 |
| D202,254 S * | 9/1965 | Floria | D12/605 |
| 3,467,159 A | 9/1969 | Semonin | 152/209 |
| 4,595,042 A | 6/1986 | Nishio et al. | 152/209 B |
| 4,708,186 A | 11/1987 | Kopsco et al. | 152/516 |

(Continued)

FOREIGN PATENT DOCUMENTS

| | | | |
|---|---|---|---|
| EP | 1 122 099 A | | 8/2001 |
| FR | 1163341 | * | 9/1958 |
| GB | 1 236 335 | | 6/1971 |
| GB | 2 021 049 A | | 11/1979 |
| JP | 08 268010 A | | 10/1996 |
| JP | 2001 039125 A | | 2/2001 |
| WO | WO 99/52720 | * | 10/1999 |

OTHER PUBLICATIONS

Shontz, BFGoodrich Mud-Terrain T/A KM, ROCKCRAWLER.com, three pages, 2001.*

(Continued)

*Primary Examiner*—Steven D. Maki
(74) *Attorney, Agent, or Firm*—Nancy T. Krawczyk

(57) ABSTRACT

A pneumatic tire has a tread designed primarily for off-road activities, comprising large lugs. The tread can be defined as having a central tread width that is divided into a central tread zone and opposing lateral tread zones. The tire also has shoulder regions extending from each lateral tread zone. The tread itself has a plurality of tread elements separated by lateral grooves in the lateral tread zones. The lateral grooves in the lateral tread zones are protected by elongated pads, the pads extending from between a pair of the tread elements and into a shoulder region of the tire. Each pad has a radial height less than the adjacent tread elements and has a base width greater than 50% of the width of the lateral grooves.

13 Claims, 7 Drawing Sheets

U.S. PATENT DOCUMENTS

| | | | |
|---|---|---|---|
| 5,388,627 A | 2/1995 | Nakada | 152/454 |
| 5,549,147 A * | 8/1996 | Kuhr et al. | 152/209 R |
| 6,401,774 B1 * | 6/2002 | Rooney | 152/209.12 |
| 6,499,523 B1 | 12/2002 | Giraud | 152/534 |
| D469,737 S * | 2/2003 | Guidry | D12/605 |
| 6,530,405 B1 | 3/2003 | Brown et al. | 152/209.16 |
| 6,533,007 B1 * | 3/2003 | McMannis | 152/209.16 |
| 6,539,994 B1 | 4/2003 | Ruffa | 152/157 |
| 2003/0041939 A1 * | 3/2003 | Allison et al. | 152/209.1 |
| 2004/0123926 A1 * | 7/2004 | Rooney | 152/209.12 |

OTHER PUBLICATIONS

BFGoodrich Tires Introduces Krawler T/A, ROCKCRAWLER.com, two pages, 2002.*
Machine translation for French 1163341.*
Shontz, BFGoodrich Mud-Terrain T/A KM, ROCKCRAWLER.com, 2001, seven pages including pp. 1-3 of original and four pages of enlargements.*
Advertisement—BFGoodrich Krawler T/A $^{KX}$, 2003.
Advertisement—BFGoodrich Mud-Terrain T/A$^{KM}$, 2003.

* cited by examiner

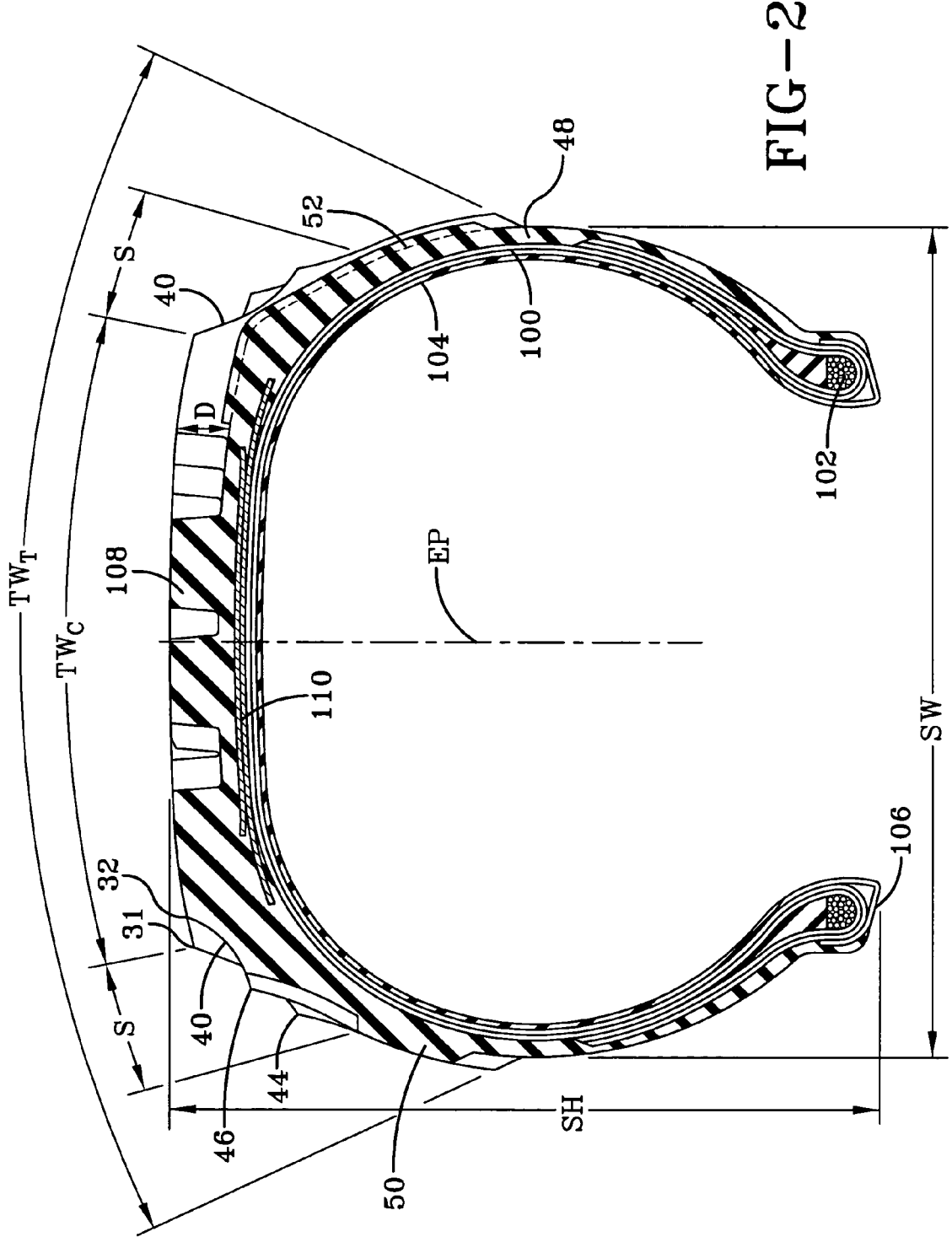

TIRE TREAD WITH ANTI-PUNCTURE PADS

FIELD OF THE INVENTION

The present invention is directed to a pneumatic tire. More specifically, the present invention is directed to light truck and passenger vehicle tires and puncture pads for the outer regions and upper sidewalls of such tires.

BACKGROUND OF THE INVENTION

Over the last twenty years, off-road vehicle recreational activities have become increasingly popular. The number of off-road sporting events and rock crawling competitions has increased. Tires suitable for such events are typically heavily lugged tires, with large spacing for improved traction and a high number of biting surfaces to enable the tire to both grip the uneven terrain and to throw out any mud. Those tires used almost exclusively for such sporting events are manufactured with an enhanced construction to improve durability under severe conditions.

Because of the popularity of such events, the look of the off-road tire has transitioned into use for conventional vehicle use. Light truck and passenger vehicle tires with a more rugged look have become increasingly popular and when mounted on light trucks and SUV's enable the operator to drive in limited off-road conditions and to participate in off-road recreational activities. The widely spaced lugs of such tires increases the possibility of punctures and cuts in the unprotected under-tread and shoulder areas of the tire. In some applications, operators will reduce inflation pressures to further improve the off-road traction. However, this causes the tire to bulge in the shoulder areas, exposing those areas of the tire to further risk of puncture.

To decrease the risk of punctures and cuts, current methods include increasing the under-tread gauge, increasing the net-to-gross ratio of the tread, adding plies and belts to the carcass, or using new rubber compounds. These methods not only increase the weight and cost of the tire but also limit off road performance.

BFGoodrich's Mud-Terrain and Krawler tires are designed for off-roading activities, and have defined by larged lugged treads. The shoulders of tire tires are defined by multiple biting edges. However, the shoulder lugs are widely spaced, creating the risk of punctures and cuts. In an apparent attempt to eliminate such problems, every other shoulder groove of the Krawler and every shoulder groove of the Mud-Terrain has a very thin rib in the base of the groove. This very thin rib is also located in the tread shoulder. However, due to the thickness and width of the rib, a large portion of the groove remains exposed to the elements and the edges of the adjacent lugs are still exposed to cuts and tearing.

SUMMARY OF THE INVENTION

The present invention is directed to a method of increasing the puncture resistance of a tire with minimal increase in the tire weight and cost. The disclosed method increases the puncture resistance of the tire where it is most needed—in the outer tread and upper shoulder regions of the tire, and is applicable for all types of light truck passenger vehicle tires.

Disclosed is a pneumatic tire, the tire having a tread designed primarily for off-road activities, comprising large lugs. The tread can be defined as having a central tread width that is divided into a central tread zone and opposing lateral tread zones. The tire also has shoulder regions extending from each lateral tread zone. The tread itself has a plurality of tread elements separated by lateral grooves in the lateral tread zones. The lateral grooves in the lateral tread zones are protected by elongated pads, the pads extending from between a pair of the tread elements and into a shoulder region of the tire. Each pad has a radial height less than the adjacent tread elements and has a base width greater than 50% of the width of the lateral grooves.

In one aspect of the disclosed invention, the elongated pads protecting the base of the lateral grooves are located in every lateral groove in the lateral tread zones. Alternatively, the pads may be located in every other lateral groove.

In another aspect of the invention, circumferentially adjacent protection pads have different radial lengths. The different radial lengths may or may not correspond to different lateral groove lengths.

In another aspect of the invention, the elongated pads have a tapering cross-sectional configuration along the smallest dimension. The smallest dimension is measured perpendicular to a line extending equidistant between opposing groove walls. The cross sectional configuration may be triangular or trapezoidal.

In another aspect of the invention, the elongated protection pads may have a constant or non-constant width. If there is a variation in width, it may correspond to a change in width of the lateral groove in which the pad is located. Alternatively, the variation in width may be independent of the groove width and be more of a factor based upon where there is a greater need for protection of the groove base.

In another aspect of the invention, the elongated pads are formed by borrowing material from the tread groove, and maximizing the material usage. Because of this method of formation, and the need to keep the grooves open to water flow, the pads have a maximum radial height of at 30% of the non-skid tread depth. The pads also preferably have a base width of 50–90% of the lateral groove width.

In another aspect of the invention, the pads are defined by a pair of opposing sides. Each side is adjacent a tread element that forms part of the lateral groove wall. The sides are inclined relative to the radial direction of the tire. The inclined sides assist in deflecting any items that enter the groove.

Definitions

The following definitions are controlling for the disclosed invention.

"Annular" means formed like a ring.

"Axial" and "axially" mean lines or directions that are parallel to the axis of rotation of the tire.

"Circumferential" means lines or directions extending along the perimeter of the surface of the annular tire parallel to the Equatorial Plane (EP) and perpendicular to the axial direction.

"Inner" means toward the inside of the tire and "outer" means toward its exterior.

"Lateral" means an axial direction.

"Radial" and "radially" mean directions radially toward or away from the axis of rotation of the tire.

"Section height" means the radial distance from the nominal rim diameter to the outer diameter of the tire at its equatorial plane.

"Shoulder" means the upper portion of sidewall just below the tread edge. Tread shoulder or shoulder rib means that portion of the tread near the shoulder.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which:

FIG. 2 is a cross-sectional view of a tire;

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
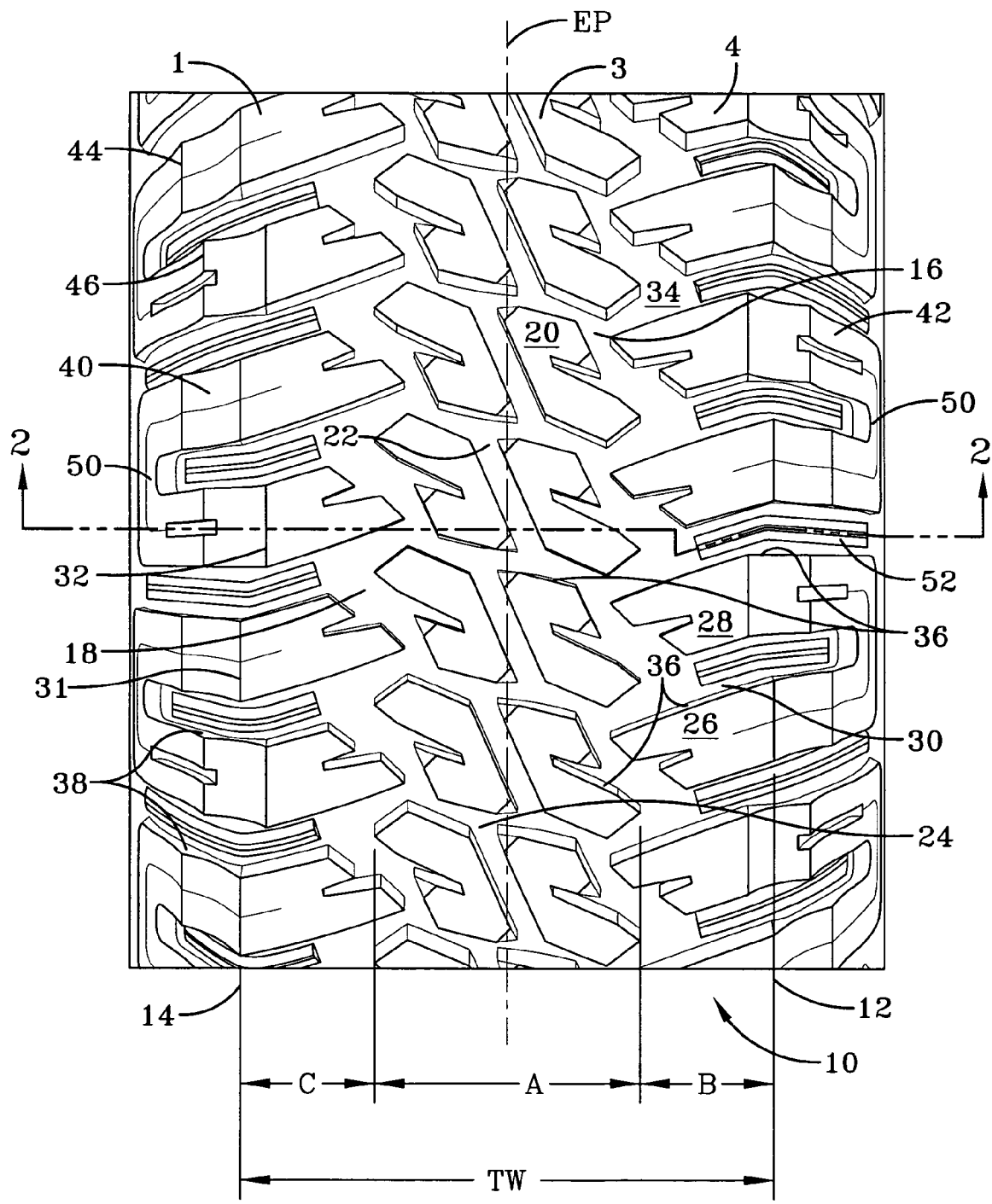
FIG. 1 is an overview of a tire and tire tread.

FIGS. 1 and 2 illustrate a light truck tire. The tread is similar to that disclosed in U.S. Pat. No. 6,530,405 and is a light truck tire having increased traction properties. The tire has a carcass 100 that extends between and is turnup around a pair of opposing beads 102 and is radially outward of an innerliner 104 that extends between opposing bead toes 106. Radially outward of the carcass 100 and inward of the tread 108 is a belt structure 110 comprising multiple plies of reinforcing cords. The tread 108 as illustrated has an on-road central tread portion 10, defined between a pair of lateral edges 12, 14, and having a width TWc. Axially outward of each lateral edge 12, 14 is a shoulder region S.

The central portion 10 of the tread is divided laterally into three zones, A, B, C. The central zone A is positioned between a pair of circumferential grooves 16, 18. The first shoulder zone B is located between the first lateral edge 12 and the nearest circumferential groove. The second and opposing shoulder zone C is located between the second lateral edge and the nearest circumferential groove. The central tread zone A preferably has a width greater than the shoulder zones B, C, while the shoulder zones B, C have equal widths.

The central tread zone A has a plurality of ground engaging traction elements 20 separated by the circumferential grooves 16, 18, a central circumferential groove 22 and lateral grooves 24. Each element 20 extends radially outwardly from a tread base to a radially outer surface. The traction elements 20 as shown are block elements.

In each shoulder zone B, C, a plurality of ground engaging traction elements 26, 28, shown as block elements, are separated by lateral grooves 30. These lateral grooves 30 may intersect and join with the central zone lateral grooves 24 to form a continuous lateral groove path across the tread width TW. The shoulder block elements 26, 28 are laterally elongated block elements. Shoulder block elements 26 have a greater lateral width, extending from an axially outer edge 31 coincident with the lateral edges 12 or 14 to a location axially inwardly. Circumferentially adjacent each long shoulder block element 26 is a relatively short block element 28. The short block elements 28 have an axially outer edge 32 spaced axially inward of the lateral edges 12, 14. Both the long block element 26 and the adjacent short block element 28 extend axially inward toward the central tread zone A, and the respective axially inner ends of both block elements are preferably axially aligned, though not necessarily similar in shape.

One of the primary features of the tread is that it extends beyond the lateral edges 12, 14, providing off-road performance characteristics. As seen in the cross-sectional view of FIG. 2, the shoulder block elements 26, 28 begin at a location at or above the radial location of the maximum section width of the tire and accordingly defines the total effective tread width TWt. The shoulder regions S of the tire extend axially outward from the central tread width TWc, and have terminate axially inward of the total effective tread width TWt. The shoulder regions have an axial width less than the total effective tread width TWt; have a radial height of 25% or less of the section height SH of the tire, as measured from the tread lateral edge 12, 14.

The block elements 26, 28 protrude outwardly from the tread base 34 and provide traction leading edges 36. When the block elements 26, 28 extend through the shoulder regions S of the tire, additional biting or leading edges 38 are provided by concave portions 40 and extensions 42. Each block element 26, 28, has a concave portion 40 extending from the axially outer edges 31, 32 to a location 44, 46 radially outward of the radially inner edge of the tire shoulder regions S. Radially inward of each concave portion 40, each block element has an extension 42 extending from the shoulder region S into the tire sidewalls 48. The extensions 42 have a radial height from the tire sidewall surface of at least ⅓ the tread depth D as measured from the tread base 34.

As the block elements 26, 28 extend through the shoulder regions S and into the sidewalls 48, the defining lateral grooves 30 may also be viewed as extending into the shoulder regions S and into the sidewalls 48.

Radially inward of the concave portions 40, the longer block elements 26 and the shorter block elements 28 are illustrated as being connected through a circumferentially extending element 50. Connecting the block elements 26, 28 provides additional stability to the block portions in the shoulder regions S, but may be excluded. If the connecting elements 50 are present, circumferentially adjacent connecting elements 50 may be radially offset, as seen in FIGS. 1 and 2. If the connecting elements 50 are not present, the circumferentially adjacent extensions 42 of the block elements 26, 28 may terminate at radially offset locations to create offset biting edges.

When conventionally molded, a tire is formed by placing a green tire in a tire mold; the tread region of the tire is a solid ungrooved strip of green rubber. The mold is provided with a series of ribs and grooves that form, in reverse, the grooves and ribs of the cured tire. During curing of the tire, the tread rubber flows into the mold grooves, forming tread elements of ribs, blocks, or lugs. The volume of tread rubber that flows into the mold grooves to form the tread elements is understandably greater than the volume of tread rubber required to form the tread grooves. Because of the greater rubber volume required, the radially inner profile of the tread rubber is not even across the tread width or tread circumference, see FIG. 3, leaving the tread grooves with a thicker undertread. The present invention seeks to take advantage of the thicker undertread in the grooves and reshape the groove to provide an increased puncture resistance to the tire with a minimal increase in the tire weight and cost.

In accordance with the present invention, in at least one of the shoulder lateral grooves 30 is an anti-puncture pad 52. For the illustrated tread, the anti-puncture pad 52 initiates axially outward of the axially innermost edge of the block elements 26, 28 in the lateral tread zones B, C and extends at least into the shoulder region S. Preferably, the anti-puncture pad 52 extends through the shoulder region S to provide puncture resistance to the entire shoulder region as the tire operates in a manner so that the total tread width TWt is engaged with a contact surface during operation.

Figure 3A:
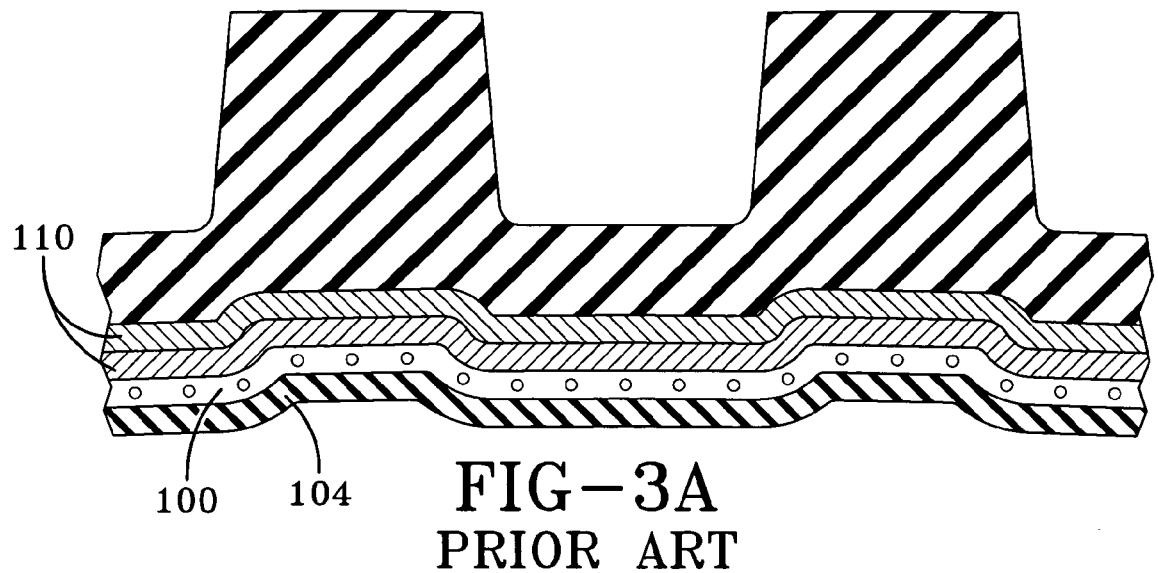
FIG. 3A is a detailed cross-sectional view of a section of a conventional tire.
Figure 3B:
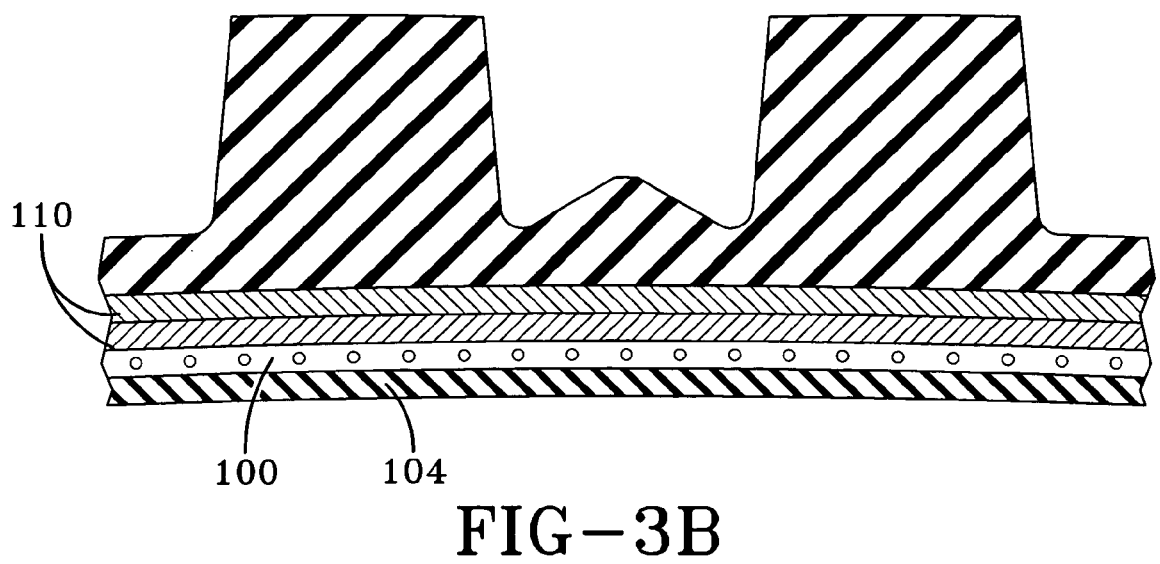
FIG. 3B is a detailed cross-sectional view of a section of a tire in accordance with the present invention.

By reallocating the tread rubber to form the anti-puncture pads, the radially inner profile of the tread rubber is more uniform in comparison to the prior art tread of FIG. 3A, see FIG. 3B. The more uniform radially inner tread rubber profile also improves the uniformity of the adjacent plies in the belt structure 110. This also results in improved uniformity for the tire.

Figure 4A:
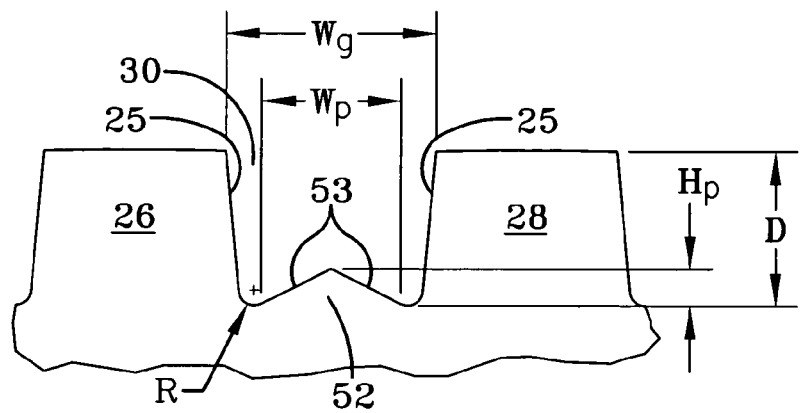
FIGS. 4A–D are alternative cross-sectional configurations for the anti-puncture pad.
Figure 4B:
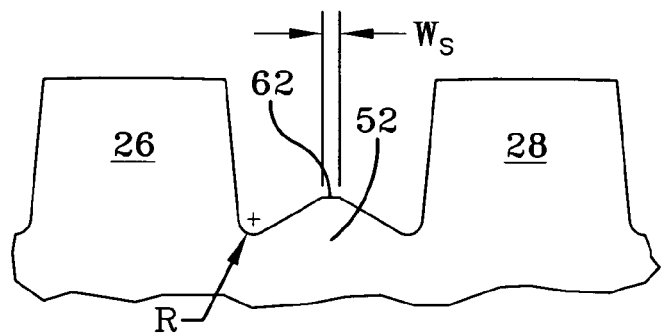

In the central tread width TWc, inward of the lateral edges of the tread, the anti-puncture pad 52 has a radial height Hp less than the non-skid tread depth D and less than the radial height of the adjacent block elements 26, 28, see FIG. 4a. The radial height Hp of the anti-puncture pad 52 is dependent upon the thickness of the tire tread and the undertread. As one goal of the invention is to provide puncture resistance with minimum weight increase, preferably, the thickness of the green tread rubber is not increased to compensate for the presence of the anti-puncture pads 52. The anti-puncture pad 52 is formed using the tread rubber that would not have flowed during molding and would have created the thicker undertread in the groove regions of the tire. The maximum radial height Hp of the anti-puncture pad in the central tread width TWc is 30% of the non-skid tread depth D. As the anti-puncture pad 52 progresses into the shoulder regions S, the radial height Hp of the pad 52 may change depending on the thickness of the undertread and the amount of green rubber present prior tot tire molding. Preferably, the radial height Hp remains constant.

When viewed in cross-section along the smallest dimension of the anti-puncture pad 52, as see in FIG. 4a, the anti-puncture pad 52 has two opposing deflecting walls 53. The walls 53 are profiled to deflecting any projections or objects that enter into the groove 30. To provide the maximum protection to the groove, each deflecting wall 53 initiates at the radius R at the base of each adjacent block/groove wall 25. The deflecting wall 53 smoothly slopes towards the maximum height Hp. The maximum cross-sectional width Wp of the anti-puncture pad 52 is 50 to 90% of the width Wg of the lateral groove 30 in which the anti-puncture pad 52 is located. The width Wp and Wg are measured parallel to a centerplane of the tire or the circumferential direction of the tire, with the groove width Wg being measured at the tread surface.

As the anti-puncture pad extends into the shoulder region S, the width of the anti-puncture pad 52 may remain constant or vary in width. The anti-puncture pad should have a width Wp of at least 50% of the groove width Wg so that a majority of the tread base 34 is protected, as well as the sidewall region S of the tire.

Figure 4C:
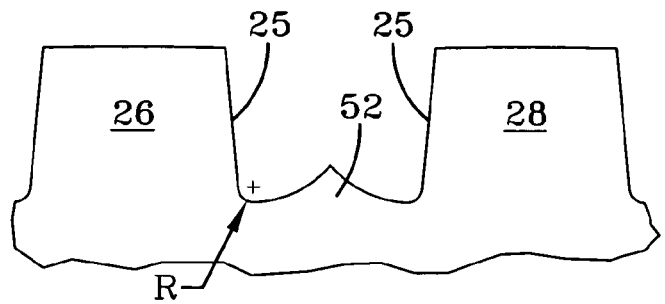
Figure 4D:
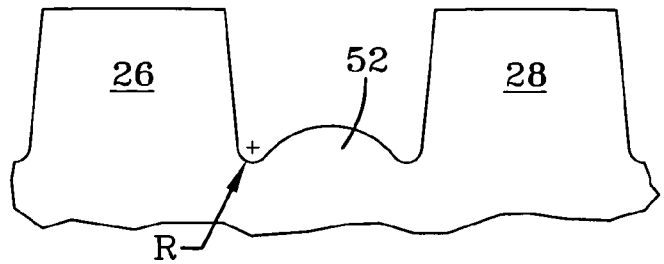

FIGS. 4a–4d show various cross sectional configurations of the anti-puncture pad 52. The anti-puncture pad 52 of FIG. 4a has two deflecting walls 53 that converge to a single point. The anti-puncture pad 52 of FIG. 4b has a relatively flat radially outer surface 62, parallel to the tread surface. The flat upper surface 62 has a Ws of not more than 10% of the groove width Wg. The flat upper surface 62 improves visibility of the anti-puncture pad, as seen in FIG. 1, while the relatively small width of the upper surface 62 maximums the wall surfaces of the pad 52 which function to deflect objects. The deflecting walls 53 may have a curvature with a radius center located radially outward of the anti-puncture pad 52, the walls 53 converge to a point as seen in FIG. 4c. In the anti-puncture pad 52 of FIG. 4d, the pad profile is similar to a single arc.

Figure 5:
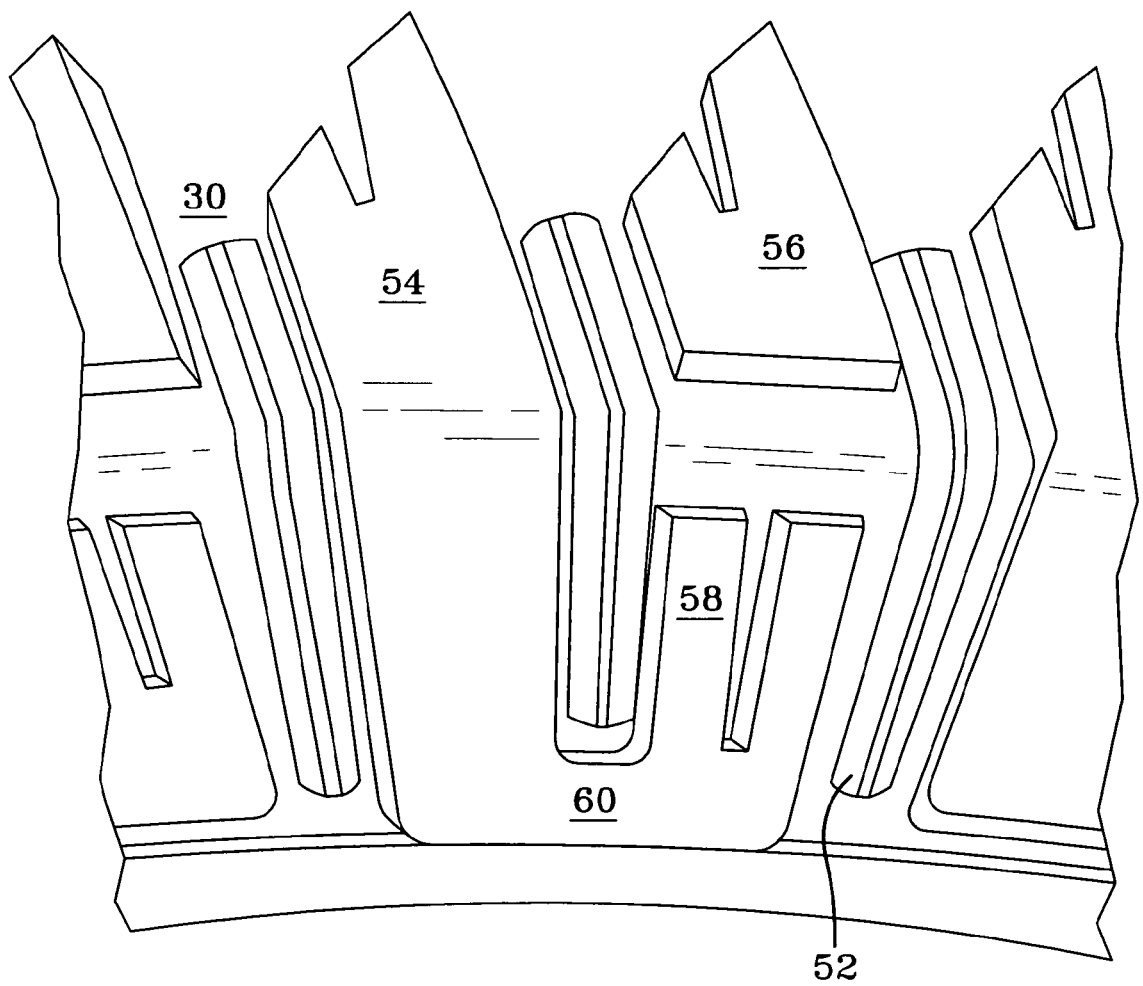
FIG. 5 is a perspective view of a tread edge and shoulder region of a tire.

FIG. 5 illustrates a portion of the tread edge and shoulder region of a tire. The block elements 54, 56 are similar to that of FIG. 1, excluding any concave portion. The longer block element 54 continues through the shoulder region S, while the shorter block element 56 terminates axially inward of the lateral edge of the tread. A shoulder element 58 is located axially inward, along the outer surface of the tire from the shorter block element 56, creating the desired multiple biting edges in the shoulder region S of the tire. The shoulder element 58 and the longer block element are again connected by a connecting element 60. If desired, the connecting element may be excluded.

The configuration of the anti-puncture pad 52 may also vary as it travels through the lateral grooves 30, as seen in FIGS. 6A–6E. In the pad 52 of FIG. 6A, the axially inner pad end 68 is inclined so as to be coincident with a line 72 formed by the axially inner end of the adjacent tread block 56. The axially outer pad end 70 also corresponds to the configuration of the element against which it abuts, in this case the connector 60. Alternatively, the anti-puncture pad 52 of FIG. 6B has rounded axial ends 74, while the anti-puncture pad 52 of FIG. 6C has pointed ends 76.

Figure 6A:
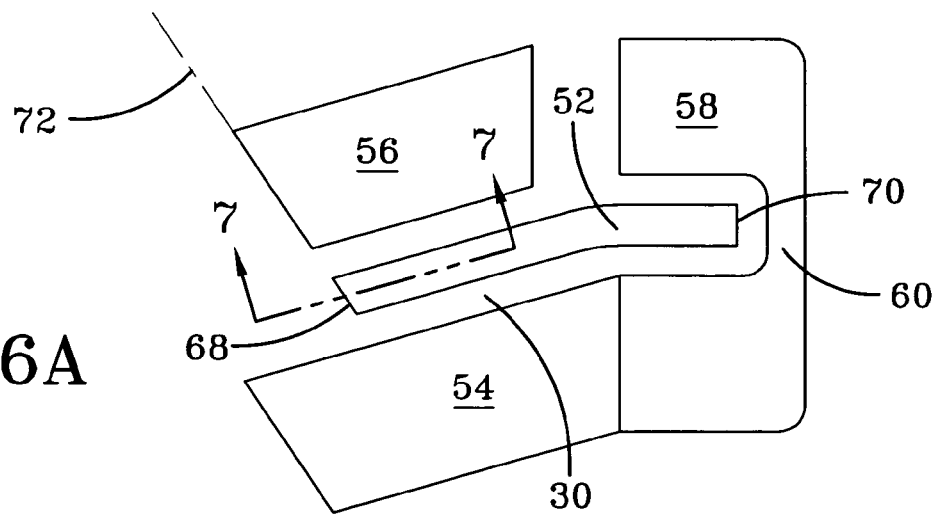
FIGS. 6A–6F are alternative configurations for the anti-puncture pad.
Figure 6B:
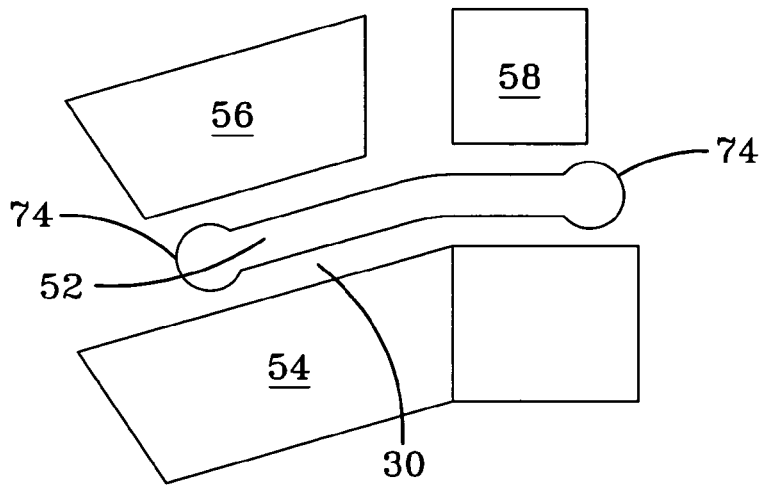
Figure 6C:
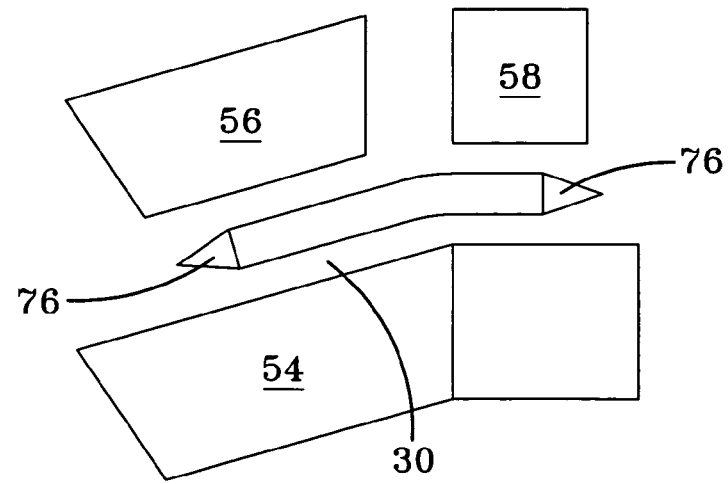
Figure 6D:
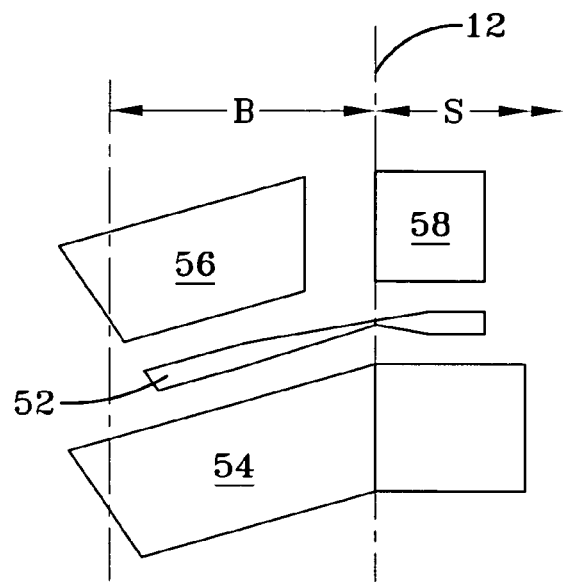
Figure 6E:
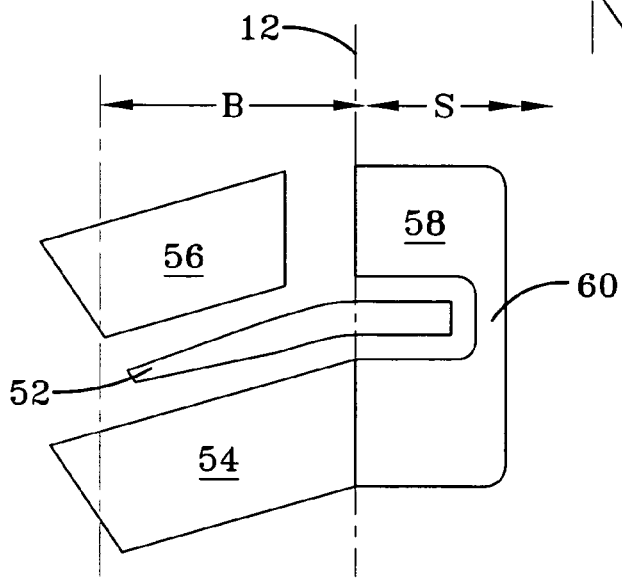
Figure 6F:
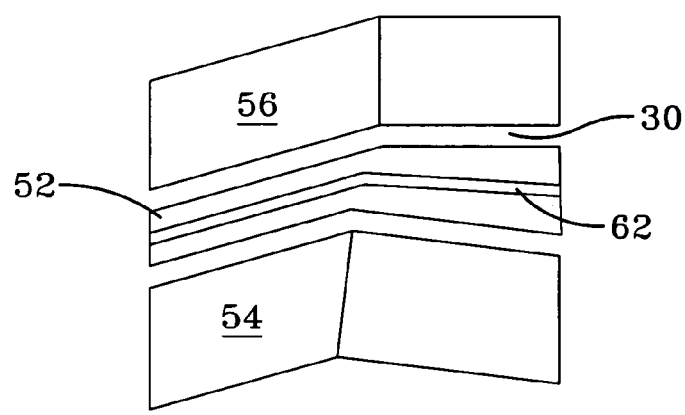

The distinction of the anti-puncture pads 52 in FIGS. 6D and 6E are the varying widths or cross-sectional areas as the pad 52 extends from a lateral tread zone B or C into the shoulder regions S. The pad 52 of FIG. 6D tapers, or decreases in cross-sectional area, towards the lateral edge 12 or 14 of the tread, then widens as the pad 52 goes through the shoulder region S. The pad 52 of FIG. 6E widens as the pad 52 approaches the lateral edge 12 or 14 and then maintains a constant width in the shoulder regions S. Additionally, if the width of the groove 30 varies, since the anti-puncture pads 52 initiate at the radius R at the base of the groove walls, the width of the anti-puncture pad 52 may also vary with the groove width, as seen in FIG. 6F.

As seen in FIGS. 1 and 5, the anti-puncture pads are located in every lateral groove 30 in the lateral tread zones B, C. When the tread blocks 26, 28, 54, 56 in the lateral tread zones B, C are connected in the sidewall regions 48 by connecting elements 50, 60, the radial extent of circumferentially alternating anti-puncture pads alternates. If no connecting element 50, 60 is present, as in FIGS. 5b and 5c, the radial extent of the anti-puncture pads 52 may still alternate or may terminate at the same radial location.

Figure 7:
FIG. 7 is a cross-sectional view along the longest axis of the anti-puncture pad.

In FIG. 7, a side view of the axially inner end 68 of an anti-puncture pad 52 is illustrated. The axially inner end 68 gradually slopes down to the base of the groove 30. The non-illustrated axially outer end of the pad 52 may also gradually slope down to the base of the groove 30. Any of the previously illustrated pads 52 may terminate in this manner.

The anti-puncture pads 52 are illustrated as being only in the lateral tread zones B, C. However, the pads 52 may extend into the central tread zone A if the lateral grooves 30 extend into the central tread zone A.

The puncture pads 52 are preferably molded into the tread when the tread pattern is formed during vulcanization. If not formed during molding of the tire, the puncture pads may be formed separately and applied post-cure by either the tire manufacturer or the tire consumer. The pads prevent punctures by placing more rubber between a penetrating object and the tire carcass and by prevent "direct hits" into the carcass by deflecting a penetrating object.

What is claimed is:

1. A light truck or passenger vehicle pneumatic tire comprising a tread and a belt structure, the tread having a central tread width that is divided into a central tread zone and opposing lateral tread zones, the tire further comprising shoulder regions extending from each lateral tread zone, the tread comprising a plurality of tread elements separated by lateral grooves in the lateral tread zones, the tread elements in the lateral tread zones defining a total effective tread width, the tread elements having block walls defined by the lateral grooves, and elongated pads in the lateral grooves, the pads being in the lateral tread zones, extending between a pair of the tread elements and through the entire adjacent tire shoulder region, wherein each pad having a pair of deflecting walls, each deflecting wall initiating at a curved base of a tread element block wall, each pad having a radial height less than an adjacent tread element and a base width Wp of at least 50% of the width Wg of the lateral grooves, the width Wg of the lateral grooves being measured at an outer surface of the tread the shoulder region extending from the axially outer edge of the central tread width to a location, which is radially below the belt structure and radially above the axially outer edge of the total effective tread width.

2. The pneumatic tire of claim 1 wherein the tread has an elongated pad in every lateral groove in the lateral tread zones.

3. The pneumatic tire of claim 1 wherein circumferentially adjacent pads have different radial lengths.

4. The pneumatic tire of claim 1 wherein the pads have a tapering cross-sectional configuration along the smallest dimension.

5. The pneumatic tire of claim 4 wherein the cross-sectional configuration is triangular or trapezoidal.

6. The pneumatic tire of claim 1 wherein the pads have a constant width.

7. The pneumatic tire of claim 1 wherein the pads have a non-constant width.

8. The pneumatic tire of claim 1 wherein the pads have a radial height of not more than 30% of the non-skid tread depth.

9. The pneumatic tire of claim 1 wherein the pads have a base width of 50–90% of the lateral groove width.

10. The pneumatic tire of claim 1 wherein the pads are located between every other tread element in the lateral tread zones.

11. The pneumatic tire of claim 1 wherein the pad has a radially outer surface and the radially outer surface is parallel to the tread surface.

12. The pneumatic tire of claim 1 wherein the axially inner and axially outer ends of the pad have tapering configurations.

13. The pneumatic tire of claim 1 wherein the pad has a pair of opposing sides, the sides each being adjacent a tread element, wherein the sides are inclined relative to the radial direction of the tire.

* * * * *